United States Patent

Bill

(10) Patent No.: US 12,296,626 B2
(45) Date of Patent: May 13, 2025

(54) CONFIRMATION OF TYRE MONITORING DEVICE STATUS

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 993 days.

(21) Appl. No.: 17/418,288

(22) PCT Filed: Jun. 16, 2020

(86) PCT No.: PCT/EP2020/066551
§ 371 (c)(1),
(2) Date: Jun. 25, 2021

(87) PCT Pub. No.: WO2020/254282
PCT Pub. Date: Dec. 24, 2020

(65) Prior Publication Data
US 2022/0055423 A1    Feb. 24, 2022

(30) Foreign Application Priority Data
Jun. 17, 2019   (GB) ..................................... 1908627

(51) Int. Cl.
*B60C 23/04* (2006.01)
*B64C 25/36* (2006.01)

(52) U.S. Cl.
CPC ...... *B60C 23/0481* (2013.01); *B60C 23/0405* (2013.01); *B60C 23/0454* (2013.01);
(Continued)

(58) Field of Classification Search
None
See application file for complete search history.

(56) References Cited

U.S. PATENT DOCUMENTS

| | | |
|---|---|---|
| 3,835,451 A | 9/1974 | Church |
| 6,278,363 B1 * | 8/2001 | Bezek ................. B60C 23/0454 340/447 |

(Continued)

FOREIGN PATENT DOCUMENTS

| | | |
|---|---|---|
| CA | 2 683 303 A1 | 4/2010 |
| CN | 102126403 A | 7/2011 |

(Continued)

OTHER PUBLICATIONS

Combined Search and Examination Report for GB 2019744.8, seven pages, dated May 14, 2021.
(Continued)

*Primary Examiner* — Muhammad Adnan
(74) *Attorney, Agent, or Firm* — Nixon & Vanderhye P.C.

(57) ABSTRACT

A method, apparatus and system are disclosed in which an indication given by at least one tyre monitoring device is confirmed by input received from another source is disclosed. The method includes causing, by the control device, at least one tyre monitoring device mounted on a wheel to measure a tyre pressure and to indicate a status using an indicator provided on the tyre monitoring device; receiving, from the at least one tyre monitoring device, data representative of the status of the at least one tyre monitoring device; receiving input representative of the status indicated on the indicator of the at least one tyre monitoring device; comparing the received data representative of the status with the received input representative of the status; and taking action based on the result of the comparing.

16 Claims, 7 Drawing Sheets

(52) U.S. Cl.
CPC ...... *B60C 23/0474* (2013.01); *B60C 23/0479* (2013.01); *B64C 25/36* (2013.01); *B60C 2200/02* (2013.01)

(56) References Cited

U.S. PATENT DOCUMENTS

| | | | |
|---|---|---|---|
| 7,944,340 B1 | 5/2011 | Ghabra et al. | |
| 8,041,508 B2* | 10/2011 | Wu | B60C 23/0408 |
| | | | 701/32.4 |
| 9,120,357 B2* | 9/2015 | Deniau | B60C 23/0471 |
| 9,296,267 B2* | 3/2016 | McIntyre | B60C 23/0471 |
| 10,821,788 B2 | 11/2020 | Van Wiemeersch et al. | |
| 11,110,758 B1* | 9/2021 | Dages | B60C 23/0483 |
| 11,845,305 B2* | 12/2023 | Regef | B60C 23/0416 |
| 2002/0130771 A1* | 9/2002 | Osborne | B60C 23/008 |
| | | | 340/441 |
| 2003/0006894 A1 | 1/2003 | Konchin | |
| 2004/0164140 A1* | 8/2004 | Voeller | G07C 5/008 |
| | | | 235/375 |
| 2006/0012475 A1 | 1/2006 | Froitzheim et al. | |
| 2006/0015286 A1 | 1/2006 | Lu et al. | |
| 2006/0025897 A1* | 2/2006 | Shostak | G06K 19/0717 |
| | | | 701/1 |
| 2006/0290484 A1* | 12/2006 | Bauchot | B60C 23/0449 |
| | | | 340/442 |
| 2007/0241740 A1* | 10/2007 | Hawes | G01R 1/06788 |
| | | | 73/146.8 |
| 2007/0259690 A1 | 11/2007 | Julian et al. | |
| 2008/0094197 A1* | 4/2008 | Huang | B60C 23/007 |
| | | | 340/447 |
| 2009/0058626 A1* | 3/2009 | Watabe | B60C 23/045 |
| | | | 340/447 |
| 2012/0139751 A1* | 6/2012 | Lin | B60C 23/0479 |
| | | | 340/870.07 |
| 2012/0296513 A1* | 11/2012 | Ramseyer | G06Q 10/02 |
| | | | 701/29.6 |
| 2013/0145834 A1* | 6/2013 | Mouchet | B60C 23/00 |
| | | | 141/38 |
| 2014/0165026 A1* | 6/2014 | McIntyre | G06F 8/65 |
| | | | 717/100 |
| 2015/0002318 A1 | 1/2015 | Cahill | |
| 2015/0029016 A1* | 1/2015 | Lesesky | B60C 23/0486 |
| | | | 340/442 |
| 2015/0128691 A1* | 5/2015 | Keller | B60C 23/0479 |
| | | | 73/146.5 |
| 2015/0224831 A1 | 8/2015 | Millier | |
| 2016/0272020 A1* | 9/2016 | Bill | B60C 23/0479 |
| 2017/0289732 A1 | 10/2017 | Guinart et al. | |
| 2018/0093642 A1 | 4/2018 | Casagrande et al. | |
| 2018/0178601 A1* | 6/2018 | Surendra | G07C 5/0816 |
| 2018/0361803 A1 | 12/2018 | Saburi et al. | |
| 2019/0184772 A1 | 6/2019 | Bill et al. | |
| 2020/0384815 A1* | 12/2020 | Adler | H04W 4/48 |

FOREIGN PATENT DOCUMENTS

| | | |
|---|---|---|
| CN | 103832227 A | 6/2014 |
| CN | 204674308 U | 9/2015 |
| CN | 106042789 A | 10/2016 |
| CN | 106347040 A | 1/2017 |
| CN | 107635798 A | 1/2018 |
| EP | 1 388 439 | 2/2004 |
| EP | 2 910 393 | 8/2015 |
| EP | 3 498 501 | 6/2019 |
| FR | 2911712 | 7/2008 |
| GB | 2 429 294 | 2/2007 |
| GB | 2 542 787 | 4/2017 |

OTHER PUBLICATIONS

Extended European Search Report for Application No. EP 21213732.7, seven pages, dated May 12, 2022.

CNIPA Chinese Office Action and English Machine Translation for Application No. 202080007630.5, sixteen pages, dated Jan. 19, 2024.

Office Action for U.S. Appl. No. 17/547,738, eight pages, dated Mar. 28, 2024.

International Search Report for PCT/EP2020/066551 mailed Sep. 29, 2020, 3 pages.

Written Opinion of the ISA for PCT/EP2020/066551 mailed Sep. 29, 2020, 7 pages.

Combined Search and Examination Report for GB1908627.1 dated Oct. 24, 2019, 7 pages.

Notice of Grant with English Translation for Chinese Application 202080007630.5, eight pages, dated Jun. 14, 2024.

* cited by examiner

CONFIRMATION OF TYRE MONITORING DEVICE STATUS

CROSS REFERENCE TO RELATED APPLICATIONS

The present application is a National Phase of International Application Number PCT/EP2020/066551 filed Jun. 16, 2020, which designated the U.S. and claims priority benefits from Great Britain Application Number GB 1908627.1 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading but can still take time due to a requirement to travel from wheel to wheel measuring the pressures.

It would be desirable to provide a tyre pressure measurement system which addresses some, or all, of these points.

SUMMARY

According to a first example, there is provided a method for a device of a tyre monitoring system. The method comprises causing, by the device, at least one tyre monitoring device mounted on a wheel to measure a tyre pressure and to indicate a status using an indicator provided on the tyre monitoring device; receiving, from the at least one tyre monitoring device, data representative of the status of the at least one tyre monitoring device; receiving input representative of the status indicated on the indicator of the at least one tyre monitoring device; comparing the received data representative of the status with the received input representative of the status; and taking action based on the result of the comparing. The device may be a control device.

The comparing may determine that the received data representative of the status and the received input representative of the status do not represent a same status; and the taking action comprises causing further input representative of the status indicated on the indicator of the at least one tyre monitoring device.

In some examples, when the received data and the input data do not indicate a same status, the method may further comprise: receiving further input representative of the status indicated on the indicator of the at least one tyre monitoring device; comparing the received data representative of the status with the received further input representative of the status; determining that the received data representative of the status and the received further input representative of status represent do not represent a same status; and providing an indication to initiate an error finding process. This can then be followed by causing the at least one tyre monitoring device to cease indicating the status using the indicator after the providing an indication to initiate an error finding process.

In other examples, when the received data and the input date do not indicate a same state, the method may further comprise: receiving further input representative of the status indicated on the indicator of the at least one tyre monitoring device; comparing the received data representative of the status with the received further input representative of the status; and determining that the received data representative of the status and the received further input representative of status represent a same status and responsively causing the at least one tyre monitoring device to cease indicating the status using the indicator.

The comparing may determine that the received data of the status and the received input representative of the status both represent a same status; and the taking action comprises causing the at least one tyre monitoring device to cease indicating the status using the indicator.

Optionally, the at least one tyre monitoring device is configured to indicate the status using the indicator for a predetermined first time, and the causing the tyre monitoring device to cease indicating the status using the indicator happens after a second time, which is less than the first time.

Optionally, there are a plurality of tyre monitoring devices, and the causing the at least one tyre monitoring device to cease indicating status comprises causing all of the plurality of tyre monitoring devices to cease indicating the status.

According to a further example, there is provided a device comprising: a display; a wireless communication interface; an input interface; and a processor configured to perform a method as described above. The device may be a control device.

According to another example there is provided a method for a tyre monitoring device comprising a wireless communication interface and an indicator, the method comprising: receiving, via the wireless communication interface, a first instruction from another device; responsive to the first instruction, carrying out a pressure measurement of a tyre associated with the tyre monitoring device; transmitting, via the wireless communication interface, data of the pressure measurement to the control device; activating the indicator to provide an indication based on the pressure measurement; receiving, via the wireless communication interface, a second instruction from the another device after the activating the indicator; and responsive to the second instruction, deactivating the indicator. The another device may be a control device.

Optionally, the method further comprises receiving, via the wireless communication interface, data representative of a status of a plurality of other tyre monitoring devices associated with a same vehicle; and wherein the activating the indicator to provide an indication is based on both the pressure measurement and the received data representative of the status.

Optionally, the activating the indicator is for a predetermined time period and the second instruction is received before the predetermined time period has elapsed.

According to a further example there is provided a tyre monitoring device configured to be mounted on a wheel and comprising: a wireless communication interface; a pressure sensor for sensing an inflation pressure of a tyre mounted on the wheel; an indicator configured to indicate an inflation status; and a processor configured to perform a method as described above.

According to another example, there is provided a tyre monitoring system comprising a device as described above and a plurality of tyre monitoring devices as described above.

According to still another example. there is provided a tyre monitoring system comprising a control device and a plurality of tyre monitoring devices. The control device comprises a wireless communication interface and an input interface. Each of the plurality of tyre monitoring devices is configured to be mounted on a wheel of a same vehicle and each tyre monitoring device comprises a pressure sensor, an indicator and a wireless communication interface. The control device is configured to: cause one or more of the plurality of tyre monitoring devices to measure a tyre pressure using the pressure sensor, indicate an inflation status on the indictor, and transmit data of the inflation status to the control device; receive input confirming an indication state of the indicator; and responsive to receiving the input confirming an indication state, cause the indicator of all of the one or more of the plurality of tyre monitoring devices to be deactivated.

Optionally, the control device is configured to cause all of the plurality of tyre monitoring devices to measure a tyre pressure using the pressure sensor, indicate an inflation status on the indictor, and transmit data of the inflation status to the control device.

Further features and advantages of the invention will become apparent from the following description of preferred examples of the invention, given by way of example only, which is made with reference to the accompanying drawings.

DETAILED DESCRIPTION

Figure 1:
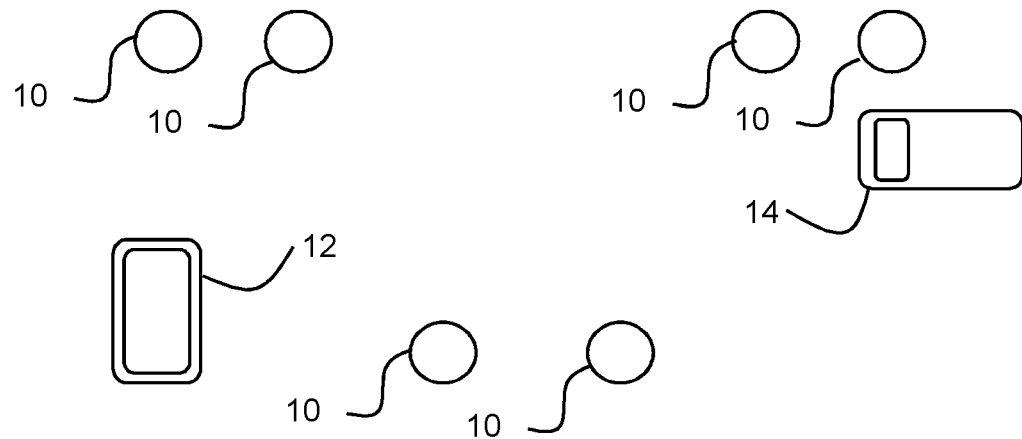
FIG. 1 shows a schematic representation of a tyre monitoring system according to a first example of the invention.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft, such as a network of tyre monitoring devices. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, tyre monitoring devices forming part of a tyre monitoring system provide an indication of the status on the tyre monitoring device itself. For example, an indication of the status may be provided by a light, with the colour of the light giving information of the status. A confirmation of the status indicated on the tyre monitoring devices is provided as an input to a control device where it can be compared to status data received from the tyre monitoring devices themselves. In this way, various human factors may be addressed in the use of the system. When the input is from a user of the system, it means that the user must pay attention to the indication on the devices themselves and not just the information displayed on the control device. This can be important when the indication on the tyre monitoring devices has been certified to a desired Development assurance level (DAL) but the indication on the control device has not. It can also address human error factors such as viewing an incorrect aircraft, when several are in close proximity. As a further advantage, an error may be identified if the user input does not match that displayed on the devices themselves.

In some examples, once the status of the indicator on the tyre monitoring device has been confirmed by the input (in other words the indicator on the tyre monitoring device and the input are both determined to represent the same status) the indicators on the tyre monitoring devices can be switched off. This can lead to power savings, because the indicator does not have to be active for as long. For example, the indicator may be a high intensity LED to allow viewing in bright sunlight. An example of a high intensity LED is the Vishay TLCR5200, a red LED commercially available from Vishay. This LED has a typical luminous intensity of 4000 mcd but dissipates 135 mW, so useful energy savings can be obtained by deactivating it sooner than an overall system timeout. Such energy savings may be particularly useful when the power source of the tyre monitoring device has finite energy reserves, such as a battery, because it will then have a direct impact on the life of the tyre monitoring device.

Example Tyre Monitoring System

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
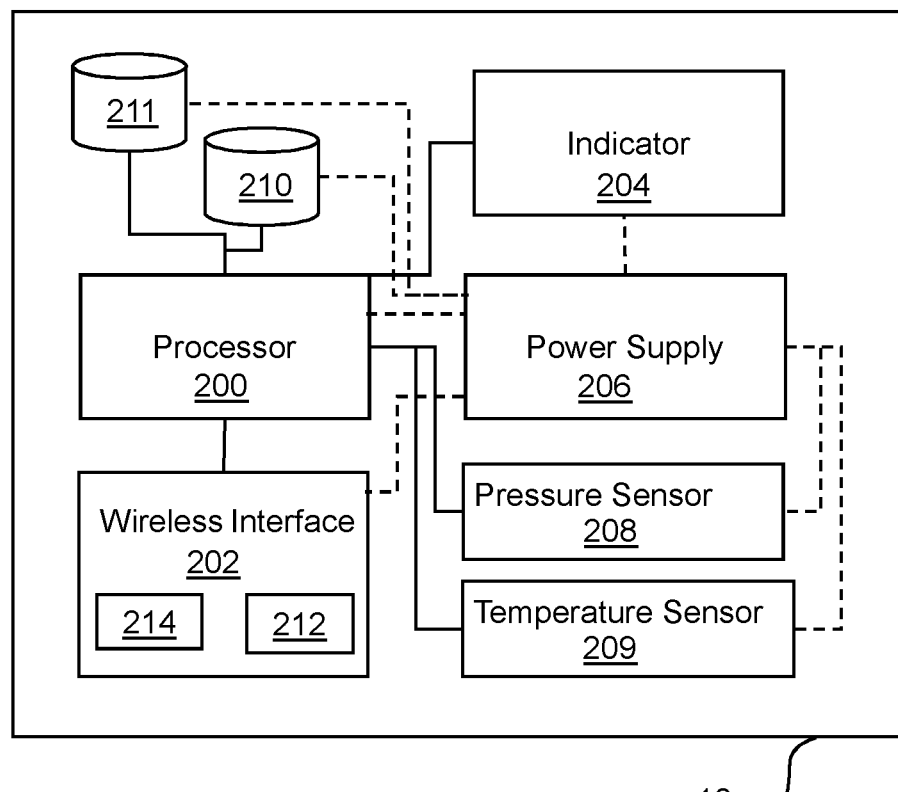
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature sensor may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
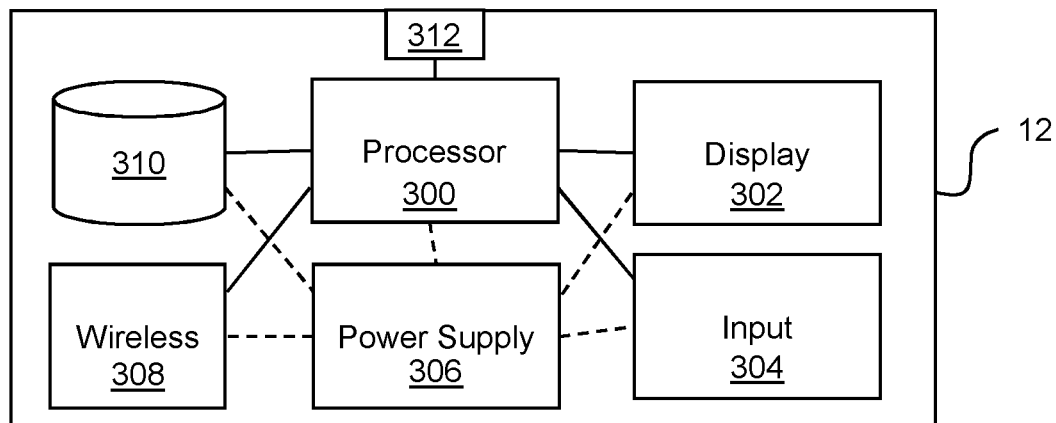
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
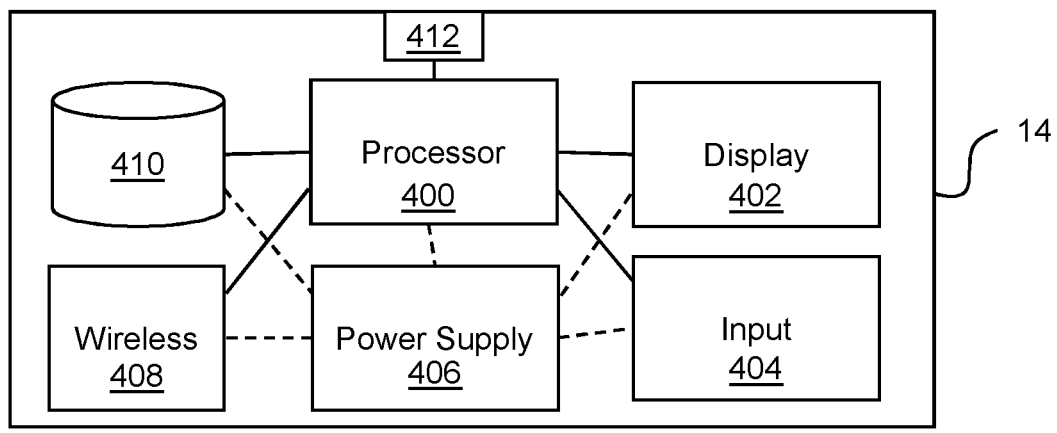
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
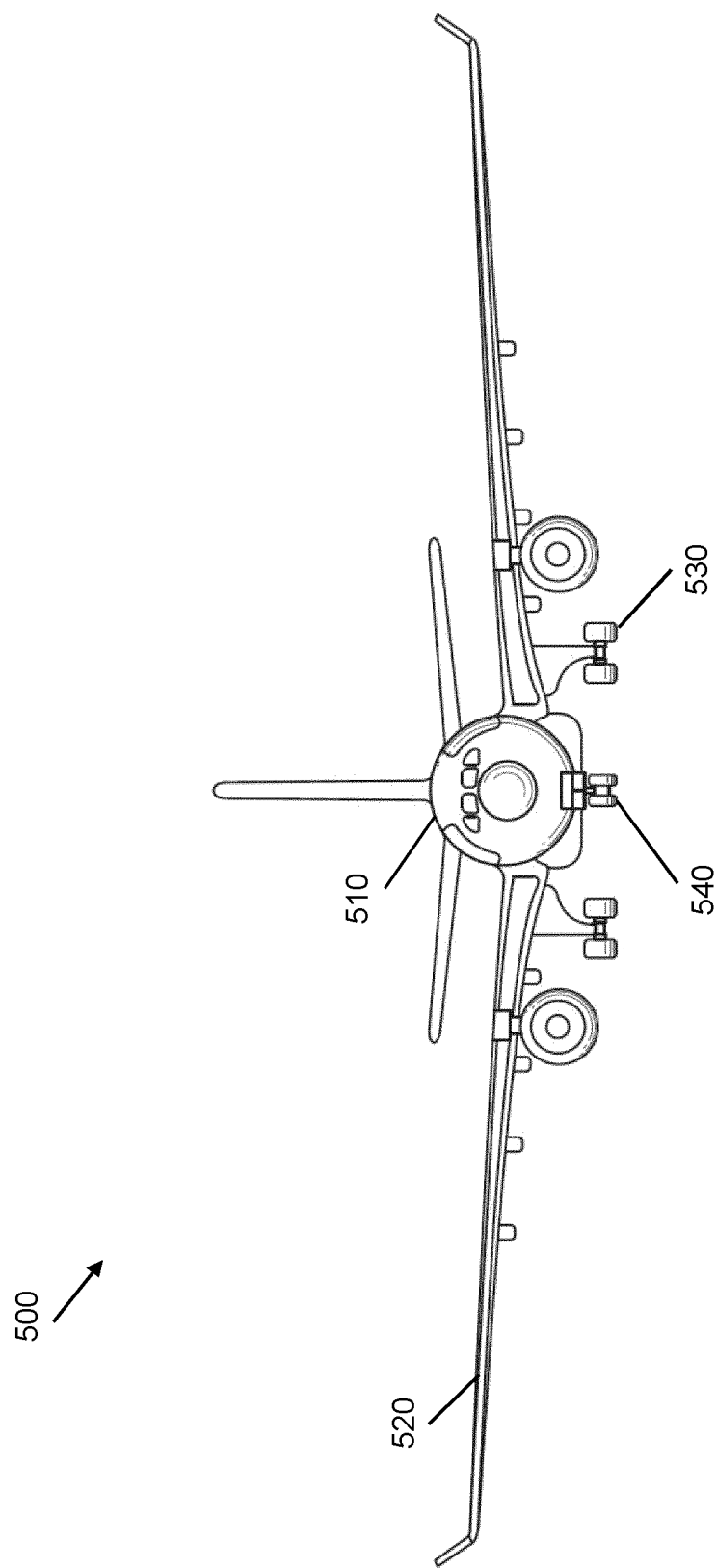
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
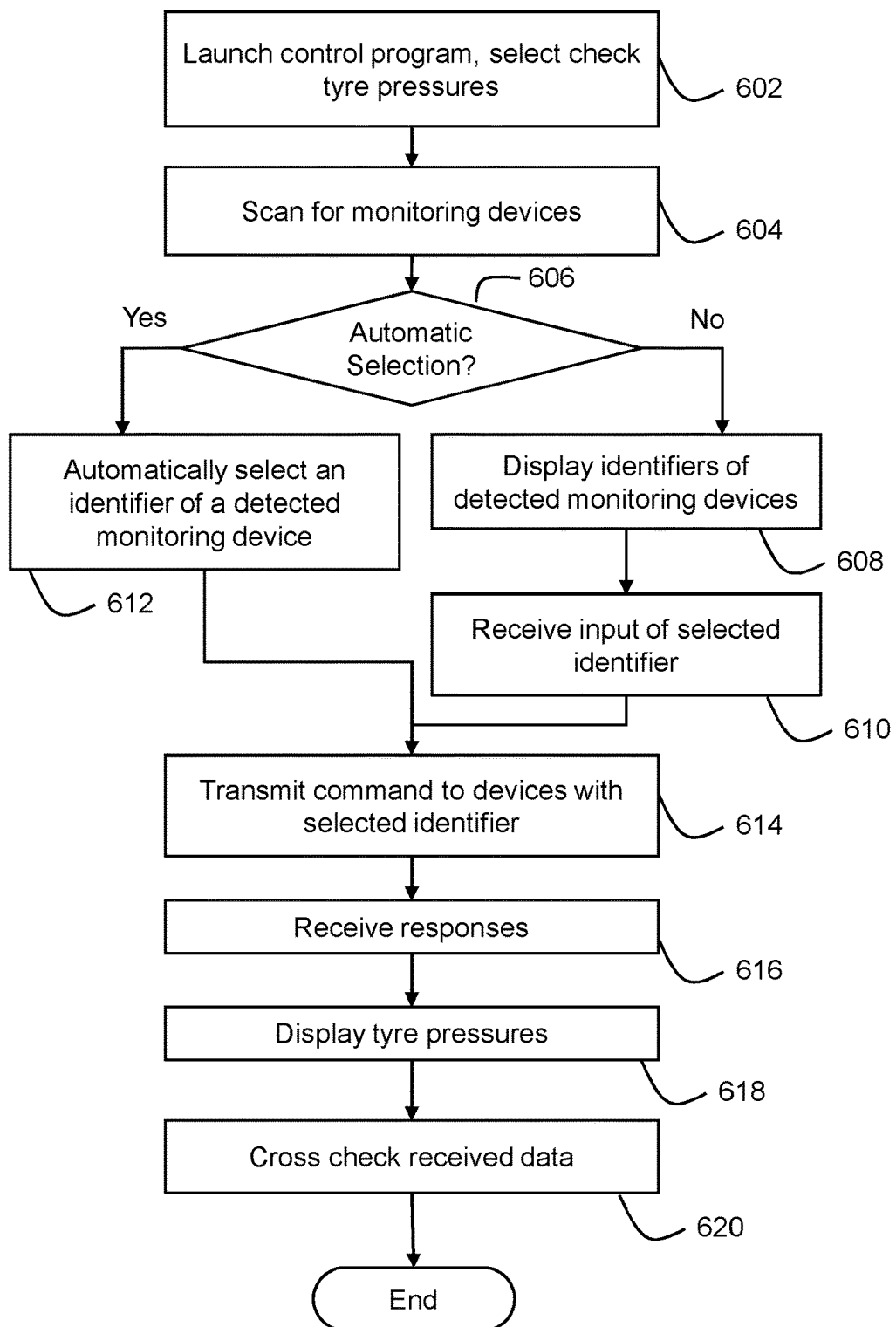
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
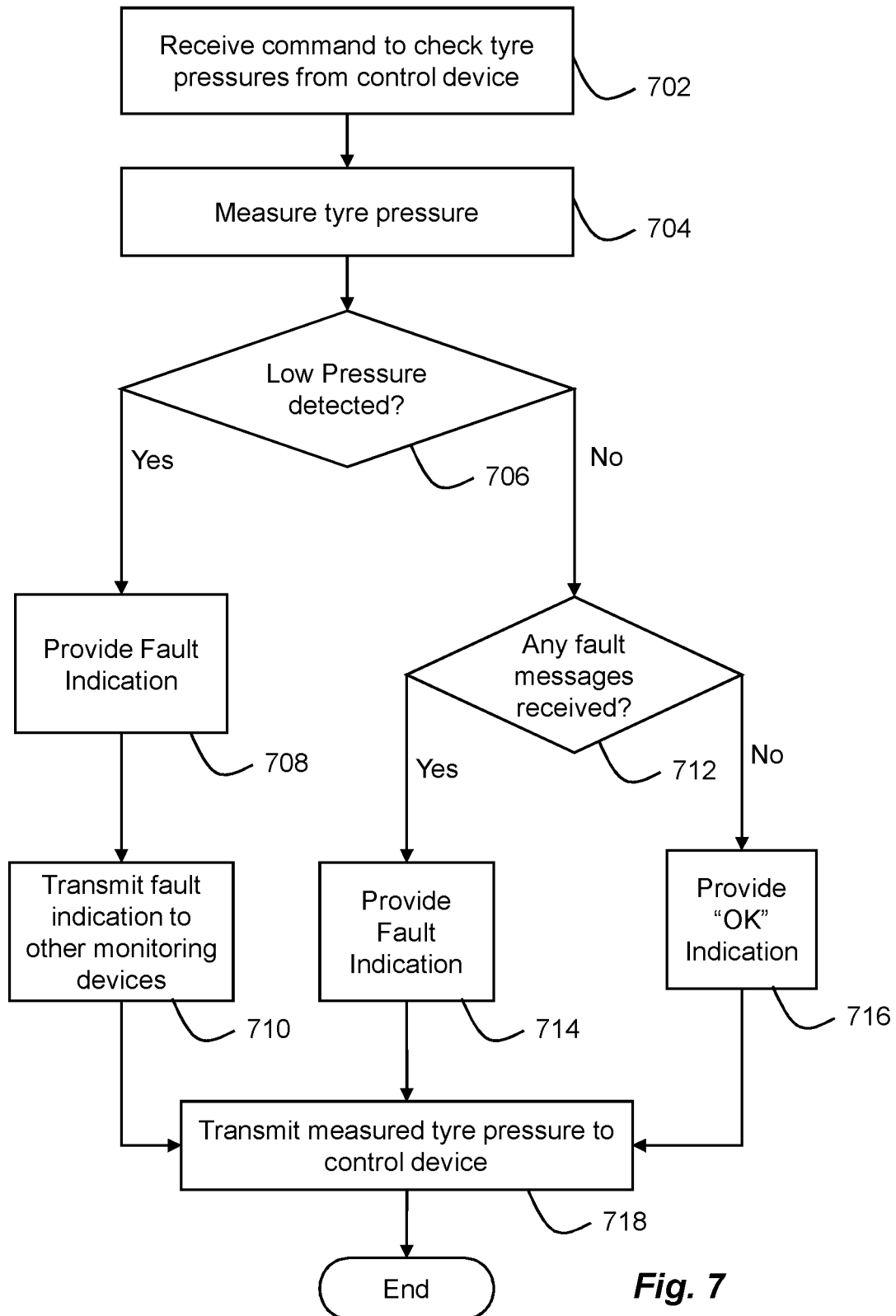
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Providing Confirmation of the Indication to the Control Device

Examples will now described with reference to FIGS. 8 and 9 in which an input confirming an indication provided on a tyre monitoring device is provided to a control device which also receives information of the status form the tyre monitoring devices themselves. This can allow reduce the possibility of errors in the system operation. In some examples, when the indication is stopped after the confirmation has provided, the amount of energy used by a tyre monitoring device can be reduced.

Figure 8:
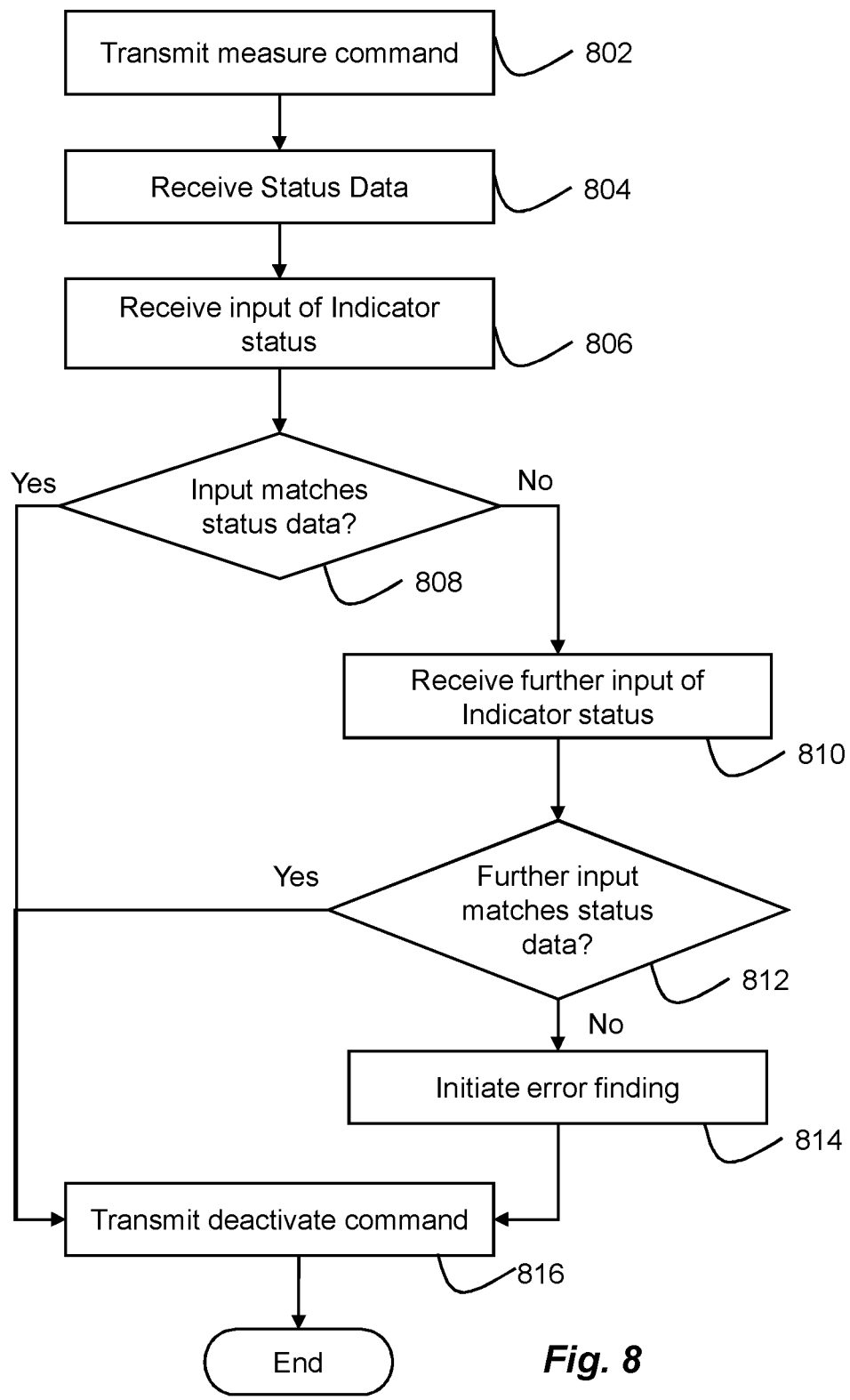
FIG. 8 shows a flow chart of a tyre monitoring process that can be used by the control device of FIG. 3 in which an indication of status on a tyre monitoring device is confirmed.

FIG. 8 depicts an example of a measurement process that is carried out by a control device of the system. At block 802 the control device causes the tyre monitoring devices associated with a vehicle, such as an aircraft, to make a measurement. In this example, this done by transmitting a measurement command via the wireless communication interface. This command instructs the tyre monitoring device to measure pressure and/or temperature according to the process of FIG. 9 described below.

Next, at block 804, status data is received back from the tyre monitoring devices after they have made their respective measurements. The status data may also include information a reference pressure so that the measurements can be identified as acceptable or not acceptable by the control device by comparison with the reference pressure. In other examples, the status data could be an indication of whether the measurement is acceptable or not without further information of the actual measurement itself.

The control device also receives an input indicating the status of the indicator on the tyre monitoring devices themselves at block 806, which in this example is provided by a user of the system. Directions may be provided for a user to input the status of the indicator through a user interface of the control device, such as by displaying a screen prompt to enter the indication provided by a tyre monitoring device. This can include options corresponding to the status of the indicator to simplify the use input, where the indicator has a relatively small number of possible states. In other examples the input may be gathered without direct user input, such as through a camera associated with the control device (for a visual indication) or a microphone associated with the control device (for an audible indication). These examples may still direct a user to position the control device so that the input can be obtained, for example to position it so that a camera has a tyre monitoring device in its field of view.

At block 808, the received status data and the input status data are compared. Depending on the received status data, some initial processing of may be required to allow a comparison with the input status data. For example. where the received data comprises a measured pressure value and information of a reference pressure this may be converted in a status of "acceptable" or "not-acceptable" by the control device before the comparison with the input status data. As explained above with reference to FIG. 7, if any tyre monitoring device associated with the same vehicle detected a fault or low pressure, the indicator of all devices will then provide a "Fault" indication. Only if all of the tyre monitoring devices are OK will an "OK" indication be provided. In this case the received data from all of the tyre monitoring devices will need to be examined to determine the status for comparison.

If it is determined that the input status matches the received status, the method proceeds to block 816. If it is determined that the input status does not match the received status, the method proceeds to block 810. At block 810 a further input of the status on the tyre monitoring devices is received. This can allow a user to correct a previous erroneous input due to human error, for example by selecting the wrong option as the input in block 808 or possibly by viewing an incorrect vehicle when there are several in proximity. The further input may be obtained in any of the ways discussed above with respect to block 806. In some examples, the further input may be obtained in a different way to guard against a possible failure of the initial input. For example, if the user provided the input in block 806 then at block 810 the input may instead be obtained from a camera or microphone, likewise if a camera provided the input in block 806 then at block 810 the input may instead be obtained from a user or a microphone.

At block 812, the further input status is compared with the received status, in the same as discussed above with reference to block 808. If it is determined that the further input status matches the received status, the method proceeds to block 816, otherwise the method proceeds to block 814.

To reach block 814, the received status has not matched the input status twice. This is indicative of an error in the system because the status indicated by the tyre monitoring devices does not match that expected by the control device. An error finding process can then be initiated. For example, a user may be directed to take manual measurements and to carry out maintenance or replacement of the tyre monitoring devices at the next scheduled maintenance. In some examples, the control device may provide information indicative of the error to a central maintenance system, to cause maintenance or replacement of the tyre monitoring devices to be scheduled.

While the method of FIG. 8 proceeds block 814 after two mismatched input status and received status checks, additional steps of seeking input data may be included in other examples. For example, blocks 810 and 812 may be repeated three, four or five times if the input data continues not the match the received status data before reaching block 814.

At block 816, a command is sent to the tyre monitoring devices to deactivate the indicator. The status of the indicator has been noted and provided to the control device via the input, and this process has caused the user to also note the status of the indicator. The indicator has served its purpose and be turned off, saving energy.

Depending on how quickly the process reaches block 816 the time for which the tyre monitoring devices activate their indicator may be significantly reduced. For example, the indication may be configured to be provided for 1, 2, 3, 4, or 5 minutes before being deactivated by the tyre monitoring device itself to save energy. In a case when the input and the received data are determined to match, the indicator may instead be deactivated in 30 seconds or less, saving 50% of the energy compared to deactivation after 1 minute by the tyre monitoring device itself. Energy savings are even greater if the tyre monitoring device is configured to wait longer before deactivating the indicator.

Although the method of FIG. 8 has been described as implemented by a control device, in other examples it may also be implemented by a configuration device.

Figure 9:
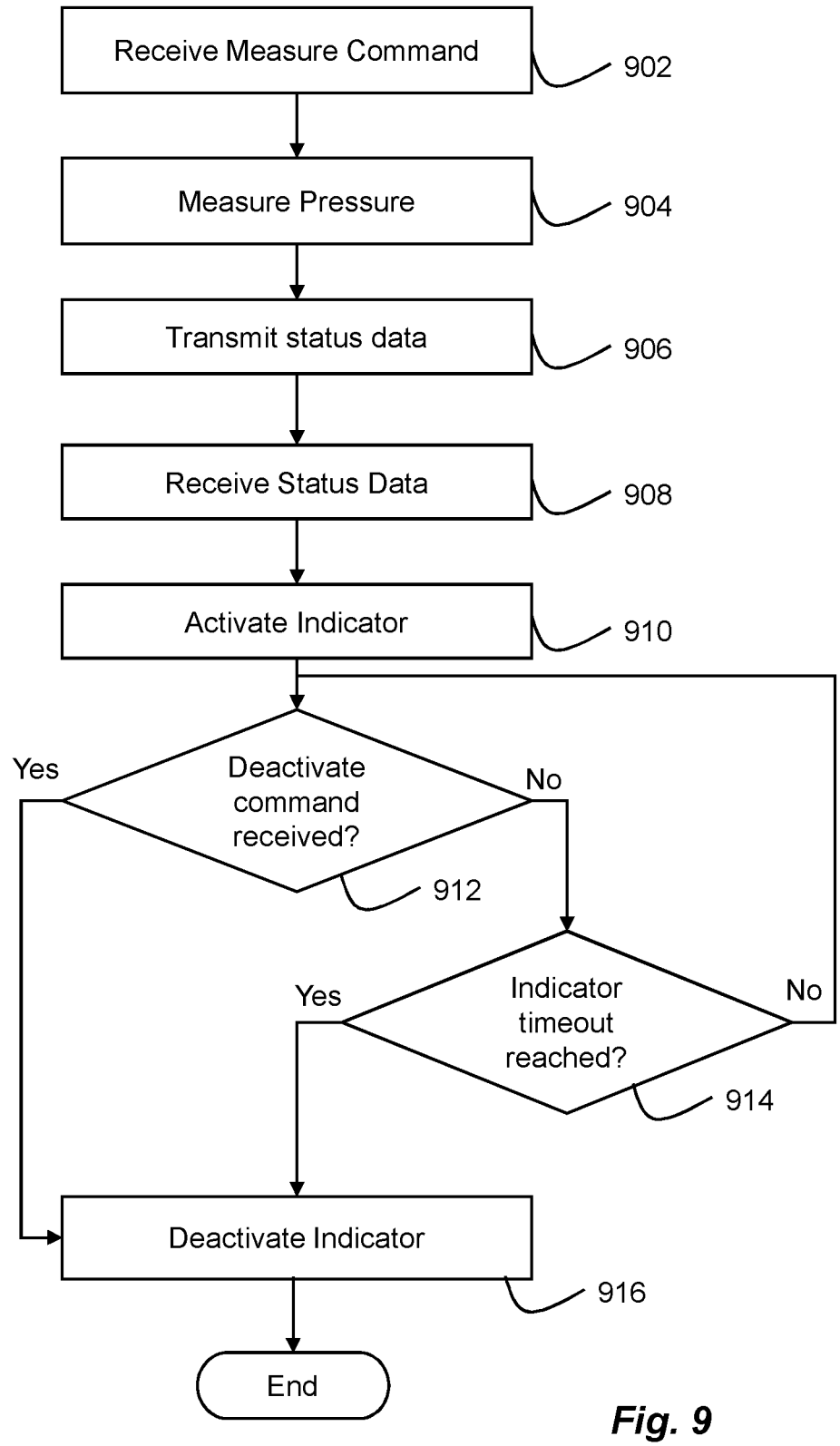
FIG. 9 shows a flow chart of a process that can be used by the tyre monitoring device of FIG. 2 in which an indicator can be deactivated earlier than a predetermined time-out period.

Referring now to FIG. 9, a process for execution by a tyre monitoring device is provided in which the indication provided by the indicator can be cancelled in response to a received command.

At block 902, the tyre monitoring device receives a command from a control device to carry out a measurement, in this case a pressure measurement, over its wireless communication interface. Responsive to the command, the tyre monitoring device uses its pressure sensor to measure the pressure at block 904. In some examples a temperature is also measured at block 904.

Next, at block 906, the tyre monitoring device transmits data of its status to the control device using the wireless communication interface. This status data may be, for example the measured pressure (and temperature if that is also measured) along with information of a reference pressure stored in the memory of the tyre monitoring device. Alternatively, the status information may be an "Acceptable" or "Fault" indication based on comparing the measured pressure to the reference pressure. In addition, status information is transmitted using the wireless communication interface to other tyre monitoring devices associated with the same vehicle, such as the same aircraft.

At block 908, the tyre monitoring device receives status data from other tyre monitoring devices associated with the same vehicle. Next, at block 910, the status information from the other tyre monitoring devices, along with the measurement carried out by the device itself, is used to activate the indicator by following the process described above with reference to blocks 706, 708, 712, 714 and 716 of FIG. 7.

At block 912, it is determined whether a command to deactivate the indicator has been received from the control device over the wireless communication interface. If a command has been received, the method proceeds to block 916. If no deactivation command has been received the method proceeds to block 914, where it is determined whether a predetermined timeout period since the indication was provided has elapsed. For example, a timer may be started when the indicator is activated at block 910 and compared against a predetermined value. The predetermined value may be 1, 2, 3, 4 or 5 minutes. If it is determined that the timeout period has elapsed, the method proceeds to block 916 to deactivate the indicator, otherwise the method returns to block 912 to check for a deactivation command.

At block 916, the indicator is deactivated or otherwise caused to cease providing the indication. For example, when the indicator comprises a light, the light may be turned off. The timer which was initiated in block 910 and which is running to monitor the timeout period is also stopped. In some examples, the long-range wireless communication interface is turned off or deactivated to save power.

In the method of FIG. 9 the indicator can be deactivated either by expiry of a timeout period or by a received deactivation command. The deactivation command can allow power savings when it is known that the status of the indicator has been noted so that the indicator need not remain activated until the end of the timeout period. As described above with reference to FIG. 8, the deactivation command is sent responsive to status information received from the tyre monitoring devices matching an input of the status on the indicator, thereby ensuring that the indicator is deactivated after its status has been noted or otherwise observed.

As described above for FIG. 9, blocks 912 and 914 describe logical tests which are repeated on a loop. In other examples, these logical tests may be replaced by an event-driven method in which block 916 is triggered by the expiry of the timer (which may generate an interrupt, for example) or by the receipt of a deactivation command.

As described above for FIGS. 8 and 9, operation with a plurality of tyre monitoring devices has been described. The number of tyre monitoring devices may correspond to the number of wheels on the vehicle, such as six for an example single aisle or narrow body aircraft.

In some examples, only one tyre monitoring device may be queried at a time, for example when individual confirmation of each tyre monitoring device is required. This could be useful in an error checking scenario, for instance, when it is desired to confirm that each individual tyre monitoring device is working correctly in isolation of the other tyre monitoring devices of the system. In that case, for the control device, the command transmitted at block 802 applies only to a single device. For example, the command may identify a single tyre monitoring device using a combination of a wheel position identifier and a vehicle identifier or a unique identifier which is specific to the tyre monitoring device itself independent of the vehicle to which it is attached. Similarly, the status data received at block 804 will be from a single tyre monitoring device. When operating in this way, the tyre monitoring device only transmits status information to the control device at block 906 and block 908 is omitted.

While FIGS. 8 and 9 have been described in the context of commands received from a control device, they can equally also to commands received from a configuration device. This may be particularly when it is desired to query only one tyre monitoring device at a time, such as for error checking. A configuration device may use a short range communication interface to command a single device to carry out a measurement, the short communication range, such as less than 30 cm, limits receipt of the command to a single tyre monitoring device.

By deactivating the indicator on receipt of the input, the time for which an indication is provided can be reduced. In one example, when the indicator is an LED and the tyre monitoring device has a power supply with a finite amount of energy, the potential power savings may equate to a useful increase in the service life of the tyre monitoring device before the power supply needs to be replaced or recharged. For example, the life of a tyre monitoring device may be increased by around 6 months by lighting an LED for 10 seconds a day rather than 60 seconds (a lifetime of around 3 years compared to around 2.5 years) for the same battery capacity.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method for a control device of a tyre monitoring system comprising:
   causing, by the control device, at least one tyre monitoring device mounted on a wheel to measure a tyre pressure and to indicate a status using an indicator provided on the tyre monitoring device;
   receiving, by the control device, from the at least one tyre monitoring device, data representative of the status of the at least one tyre monitoring device;
   receiving input at the control device representative of the status indicated on the indicator of the at least one tyre monitoring device;
   comparing, by the control device, the received data representative of the status indicated on the indicator of the at least one tyre monitoring device with the received input representative of the status; and
   taking action based on the result of the comparing.

2. The method of claim 1, wherein:
   the comparing determines that the received data representative of the status and the received input representative of the status do not represent a same status; and
   the taking action comprises causing further input representative of the status indicated on the indicator of the at least one tyre monitoring device.

3. The method of claim 2, further comprising:
   receiving further input representative of the status indicated on the indicator of the at least one tyre monitoring device;
   comparing the received data representative of the status with the received further input representative of the status;

determining that the received data representative of the status and the received further input representative of status represent do not represent a same status; and providing an indication to initiate an error finding process.

4. The method of claim 3, further comprising, after the providing an indication to initiate an error finding process, causing the at least one tyre monitoring device to cease indicating the status using the indicator.

5. The method of claim 4, wherein the at least one tyre monitoring device is configured to indicate the status using the indicator for a predetermined first time, and the causing the tyre monitoring device to cease indicating the status using the indicator happens after a second time, which is less than the first time.

6. The method of claim 4, wherein there are a plurality of tyre monitoring devices, and the causing the at least one tyre monitoring device to cease indicating status comprises causing all of the plurality of tyre monitoring devices to cease indicating the status.

7. The method of claim 2, further comprising:
receiving further input representative of the status indicated on the indicator of the at least one tyre monitoring device;
comparing the received data representative of the status with the received further input representative of the status; and
determining that the received data representative of the status and the received further input representative of status represent a same status and responsively causing the at least one tyre monitoring device to cease indicating the status using the indicator.

8. The method of claim 1, wherein:
the comparing determines that the received data of the status and the received input representative of the status both represent a same status; and
the taking action comprises causing the at least one tyre monitoring device to cease indicating the status using the indicator.

9. A device comprising:
a display;
a wireless communication interface;
an input interface; and
a processor configured to perform a method according to claim 1.

10. A tyre monitoring system comprising: a device according to claim 9.

11. A method for a tyre monitoring device comprising a wireless communication interface and an indicator, the method comprising:
receiving, via the wireless communication interface, a first instruction from another device;
responsive to the first instruction, carrying out a pressure measurement of a tyre associated with the tyre monitoring device;
transmitting, via the wireless communication interface, data of the pressure measurement to the another device;
activating the indicator to provide an indication based on the pressure measurement;
receiving, via the wireless communication interface, a second instruction from the control device after the activating the indicator;
responsive to the second instruction, deactivating the indicator;
receiving, via the wireless communication interface, data representative of a status of a plurality of other tyre monitoring devices associated with a same vehicle; and,
wherein the activating the indicator to provide an indication is based on both the pressure measurement and the received data representative of the status.

12. The method of claim 11, wherein the activating the indicator is for a predetermined time period and the second instruction is received before the predetermined time period has elapsed.

13. A tyre monitoring device configured to be mounted on a wheel and comprising:
a wireless communication interface;
a pressure sensor for sensing an inflation pressure of a tyre mounted on the wheel;
an indicator configured to indicate an inflation status; and
a processor configured to perform a method according to claim 11.

14. A tyre monitoring system comprising:
a plurality of tyre monitoring devices according to claim 13.

15. A tyre monitoring system comprising:
a control device comprising a wireless communication interface and an input interface; and
a plurality of tyre monitoring devices each configured to be mounted on a wheel of a same vehicle and each comprising a pressure sensor, an indicator and a wireless communication interface;
wherein the control device is configured to:
cause one or more of the plurality of tyre monitoring devices to measure a tyre pressure using the pressure sensor, indicate an inflation status on the indictor, and transmit data of the inflation status to the control device;
receive input confirming an indication state of the indicator; and
responsive to receiving the input confirming an indication state, cause the indicator of all of the one or more of the plurality of tyre monitoring devices to be deactivated.

16. The tyre monitoring system of claim 15, wherein the control device is configured to cause all of the plurality of tyre monitoring devices to measure a tyre pressure using the pressure sensor, indicate an inflation status on the indictor, and transmit data of the inflation status to the control device.

* * * * *